United States Patent
Hageman et al.

(10) Patent No.: US 7,904,115 B2
(45) Date of Patent: Mar. 8, 2011

(54) ADAPTIVE POWER MANAGEMENT FOR A NODE OF A MOBILE TELECOMMUNICATIONS NETWORK

(75) Inventors: Halbe Tiemen Hageman, Rijen (NL); Hendrik Friso Terpstra, Utrecht (NL); Freddy Feenstra, Hungelo (NL)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 376 days.

(21) Appl. No.: 10/596,633

(22) PCT Filed: Dec. 19, 2003

(86) PCT No.: PCT/NL03/00912
§ 371 (c)(1),
(2), (4) Date: Mar. 12, 2007

(87) PCT Pub. No.: WO2005/060287
PCT Pub. Date: Jun. 30, 2005

(65) Prior Publication Data
US 2007/0191076 A1    Aug. 16, 2007

(51) Int. Cl.
*H04M 1/00* (2006.01)
(52) U.S. Cl. .................. 455/561; 455/574; 455/67.11; 455/343; 455/127.1; 455/127.2
(58) Field of Classification Search .............. 455/574, 455/343.1, 561, 571, 572, 127.5, 423, 417, 455/522, 343.5–343.6, 13.4, 127.1, 298; 340/539.3, 693.1, 693.3, 7.32, 7.37, 425.2
See application file for complete search history.

(56) References Cited

U.S. PATENT DOCUMENTS

| | | | | |
|---|---|---|---|---|
| 5,410,740 A * | 4/1995 | Hagstrom | ................. | 455/67.11 |
| 5,784,684 A * | 7/1998 | Van Wageningen et al. | ..... | 455/9 |
| 5,822,693 A * | 10/1998 | Harrison | ................ | 455/432.1 |
| 5,864,764 A * | 1/1999 | Thro et al. | ................ | 455/561 |
| 5,920,607 A * | 7/1999 | Berg | ................ | 379/1.01 |
| 5,923,247 A * | 7/1999 | Dowden et al. | ................ | 340/506 |
| 5,974,322 A * | 10/1999 | Carlsson et al. | ................ | 455/446 |
| 6,151,483 A * | 11/2000 | Nguyen | ................ | 455/67.11 |
| 6,580,924 B1* | 6/2003 | Lu et al. | ................ | 455/560 |
| 6,584,330 B1* | 6/2003 | Ruuska | ................ | 455/574 |
| 7,269,422 B2* | 9/2007 | Gunnarsson et al. | ......... | 455/442 |
| 7,702,351 B2* | 4/2010 | Soliman | ................ | 455/522 |
| 7,756,548 B2* | 7/2010 | Laroia et al. | ................ | 455/561 |

FOREIGN PATENT DOCUMENTS

| | | | |
|---|---|---|---|
| EP | 0287305 A | | 10/1988 |
| GB | 2281458 A | * | 3/1995 |
| WO | WO 01/82641 A | | 11/2001 |

* cited by examiner

*Primary Examiner* — Nick Corsaro
*Assistant Examiner* — Babar Sarwar

(57) ABSTRACT

A telecommunication apparatus, e.g. a radio base station in a mobile telecommunications network, comprises a plurality of traffic handling units and a plurality of power supply units powering the traffic handling units. Control means are provided for determining a power budget based on a power criterion. The control means activate an amount of traffic handling units and power supply units having a total power consumption equal to or less than the power budget. The power criterion for determining the power budget can comprise any power related parameter, such as an amount of solar cell generated power, a charging condition of a backup battery, a value of a mains voltage, a failure of a power supply unit of the apparatus, etc.

18 Claims, 3 Drawing Sheets

ADAPTIVE POWER MANAGEMENT FOR A NODE OF A MOBILE TELECOMMUNICATIONS NETWORK

The invention relates to a telecommunication apparatus comprising a plurality of traffic handling units, and at least one power supply unit for powering the plurality of traffic handling units.

Such a telecommunication apparatus, e.g. a radio base station in a mobile telecommunication network, a telecommunication switch or any other telecommunication apparatus whether or not being comprised in a network, can according to the state of the art comprise a power control mechanism. The power control mechanism according to the state of the art is used to reduce power on the basis of an activity of the telecommunication apparatus. Thus, if only a low traffic is to be handled, part of the traffic handling units may be switched off. Mostly, a total capacity of the power supply units is higher than the power that would be required for the situation that all traffic handling units are active. Also, the availability of external power for the telecommunication apparatus is not used as a parameter for determining powering of the telecommunication apparatus.

The current powering mechanism has several disadvantages. In a situation where there is not sufficient power for powering the parts of the telecommunication apparatus which has been activated by the powering mechanism, there is a substantial risk that the telecommunication apparatus will not be operational at all. Secondly, the telecommunication apparatus according to the state of the art requires a power backup or redundant power supply units to be able to have additional power capacity available in a situation where one of the power supplies would fail or where external power is not sufficient to power the telecommunication apparatus, and thus power needs to be drawn from a backup. Thus, the powering mechanism according to the state of the art is inflexible as it is not or insufficiently able to cope with a decrease in a supply of external power to the telecommunication apparatus, as well as with failure of one or more power supply units, if no redundant or overdimensioned power supply units are provided.

The invention intends to at least partly solve the above problems and provides a more flexible powering for the telecommunication apparatus.

To achieve this and other goals, the telecommunication apparatus according to the invention further comprises control means for determining a power budget based on a power criterion, the control means for activating an amount of traffic handling units of the plurality of traffic handling units having a total power consumption equal to or less than the budget, and for activating an amount of power supply units of the at least one supply units matching the total power consumption of the amount of activated traffic handling units.

According to the invention, a power budget is determined by the telecommunication apparatus. The power budget expresses the amount of power that the telecommunication apparatus is allowed to dissipate at that moment. The power criterion may comprise any quantity or parameter relating to a power consumption of the telecommunication apparatus. Thus, based on the power budget, the amount of traffic handling units and a corresponding amount of power supply units matching the power consumption of the to be activated traffic handling units, is determined. Thus, in a situation where only a low amount of power is available, e.g. in a situation where a voltage of a mains powering the telecommunication apparatus is below its nominal value, e.g. due to an overload, a power budget may be determined which only allows a part of the traffic handling units and a part of the power supplies to be active. Thus, even in case that in such a situation traffic requirements would request for activation of additional traffic handling units and additional power supply units, these will not be activated as the power budget would then be exceeded, which would lead to a degradation of service of the telecommunication apparatus, e.g. because the telecommunication apparatus as a whole would malfunction due to the adverse external power supply conditions or because a power backup which could be comprised in the telecommunication apparatus would get exhausted thus deteriorating the situation more. Thus, although traffic capacity might be restricted due to the limitation of the amount of activated traffic handling units by the power budget, availability of services by the telecommunication apparatus in general would be improved as adverse effects such as a malfunctioning of the telecommunication apparatus, exhaustion of optional backup facilities, which would eventually lead to a (partly) malfunctioning of the telecommunication apparatus, may be avoided. Also a provisioning of redundant power supply units in the telecommunication apparatus may be omitted as in case of a failure of one of the power supply units, a lower power budget will be determined based on the power criterion, thus the telecommunication apparatus being able to cope with the fact that one of the power supply units thereof is malfunctioning. According to the invention, the maximum power output of the activated power supply units matches, thus is at least equal to or larger than the total power consumption of the activated traffic handling units. The traffic handling units may, within the scope of the invention, also comprise any other power consuming unit of the telecommunication apparatus, such as a monitoring or cooling system.

The power criterion can comprises one or more of a group comprising an amount of solar cell generated power, a charging condition of a battery for supplying power to the apparatus, a value of a mains voltage supplied to the apparatus, an amount of fuel in a fuel tank of a generator for generating power for feeding the apparatus, and a failure of a power supply unit. In general, the power criterion can comprise any factor which would affect a total power provisioning of the telecommunication apparatus. In case of a solar cell powering, power conditions will fluctuate frequently due to fluctuation of light conditions. Also, a mains voltages supplied to the apparatus may fluctuate, especially when the telecommunication apparatus is installed at a remote location, e.g. an area with a low density of population. Also, fluctuations in power available are likely when the telecommunication apparatus is powered by a fuel operated generator or by solar cells. To be able to cope with a defect in a power supply, a failure of a power supply can also be comprised in the power criterion. Another example of the power criterion is the charging condition of a battery of the apparatus, as in a situation where the charging condition deteriorates, power consumption of the telecommunication apparatus can, according to the invention, e.g. be reduced to avoid a quick exhaustion of the battery. Also, when an external power supply is available for recharging the batteries (e.g. solar cell generated power charging the battery during daytime), a power budget might have to be limited to ensure that the battery is sufficiently charged during daytime to be able to power the apparatus from the battery during the night.

Instead of, or in addition thereto, the power criterion can also comprise a forecast of one or more of a group comprising an amount of solar cell generated power, a charging condition of a battery for supplying power to the apparatus, a value of a mains voltage supplied to the apparatus, an amount of fuel in a fuel tank of a generator for generating power for feeding the apparatus, and a traffic load of the apparatus. Thus, the power budget can not only be based on a current situation, but also on a forecast of one or more parameters. In case of a solar cell powered telecommunication apparatus, a daily forecast may be applied, to ensure that during daytime sufficient power is used for charging the backup batteries, while during nighttime the amount of active traffic handling units is kept to such a (an average) value that it is ensured that the batteries do not get exhausted during nighttime. Also, a forecast may be based on a fluctuation of a value of the mains voltages supplied to the apparatus, which has proven to be useful in situations where during certain hours of a day the mains voltage will drop due to excessive load on the mains. Also, a forecast of traffic load may be comprised in the power criterion, as e.g. in the situation where a high load tends to coincide with a decrease in a value of e.g. a mains voltage supplied to the apparatus, various parameters may be balanced against each other and a power budget determined to maximally power an amount of traffic handling units not exceeding the power budgets, thus avoiding adverse effects such as a total breakdown of the telecommunication apparatus due to a lack of power. The forecast may be on a daily basis, however also seasonal influences, time spans between periodic fuel refilling, etc. may be taken into account. To effectuate forecasting, the control means can comprise a memory (such as a semiconductor memory, disk drive or any suitable memory means), in which data concerning one or more of the mentioned parameters is stored over a certain time period. Thus, a self learning mechanism is created which is able to adapt a total power consumption of the telecommunication apparatus based on a forecast of one or more vectors influencing powering conditions, the vectors being forecasted preferably based on historical data. Alternatively, forecasting may be based on any other suitable forecasting mechanism, such as a mathematical model (e.g. describing an average amount of sunlight available for the solar cells as a function of daytime and seasons). Unlike the state of the art, in an advantageous embodiment of the invention, the battery backup is not only used when external powering, such as a mains voltage, is cut off, but the battery backup can also be used to add power to e.g. a means which momentarily has a low voltage, a contribution of the battery backup to the powering being based on the forecast.

To achieve a smooth de-activation of a traffic handling unit, the control means are advantageously adapted for transferring active traffic from a traffic handling unit which is to be de-activated, to one or more of the activated traffic handling units, before de-activating the to be de-activated traffic handling unit. Thus, as long as other traffic handling units have capacity available, it is avoided that active traffic (such as active telephone calls) are abruptly terminated by a de-activation of a traffic handling unit, as the traffic is transferred to another traffic handling unit before de-activation.

Advantageously, a maximum power output of a subgroup of the plurality of power supply units matches a maximum power consumption of a subgroup of the plurality of traffic handling units. More advantageously, a maximum power output of a single power supply unit matches a maximum power consumption of a single traffic handling unit. In this manner, optimum performance may be achieved at each time that more or less power is available, a single traffic handling unit and a single power supply unit may be activated or de-activated at the same time. Generally spoken, a granularity is chosen in such a way that the power output of a single power supply unit is smaller than the biggest power consumption of one or more of the traffic handling units. In a further preferred embodiment the subgroups represent all power supply units and all traffic handling units, the total power supplied by the power supplies thus matching the total power consumption of all traffic handling units of the telecommunication apparatus.

In an advantageous embodiment, the control means comprise a power status monitor for determining the power budget based on the power criterion, a regulator for generating a regulator signal from an amount of active traffic, and a decider for deciding on an activation of one or more of the plurality of power supply units based on the power budget as determined by the power status monitor, the regulator signal and an actual power consumption. The decider thus decides on activation or de-activation of power supply units and/or traffic handling units based on the power budget, the regulator signal and an actual power consumption. An amount of active traffic is taken into account via de regulator. The regulator effectuates a desired behaviour of the telecommunication apparatus as dependent on an amount of active traffic. The regulator can comprise a proportional regulator such that a higher traffic results in a higher regulator output signal, the regulator can further comprise an integrator to avoid sudden changes in the regulator signal, and thus sudden activation or de-activation of elements of the telecommunication apparatus upon sudden changes in the active traffic. As an operational life of some parts of the telecommunication apparatus might be largely determined by the number of power-on's and power-off's, a repetitive activation and de-activation might be undesirable to prevent adverse effects on lifetime of such components, the integrator which is preferably comprised in the regulator at least partly preventing this. Further, the regulator can comprise a differentiator, a differentiating constant preferably being based on a rise in time of a percentage of active calls in relation to the maximum number of calls or other traffic. A practical value of the differentiating constant is in the range of 1-2% per minute, a value in urban areas being preferably higher than a value in rural areas.

The decider advantageously comprises a decision mechanism for taking account of the power budget as a limit value, the regulator signal as a desired value, and the actual used power as an actual value, the decision mechanism being adapted for activating as many power supply units and traffic handling units as required to match the regulator signal, the decision mechanism however being adapted to activate not more power supply units and traffic handling units than allowed by the power budget. Thus, if sufficient power is available, the decision mechanism activates as many power supply units and traffic handling units as required to match the traffic requirements, while the activation of the units is limited as to avoid exceeding of the power budget.

In a further advantageous embodiment the control means comprise a stay alive mechanism for when the power budget is under a first, predetermined level, only activating power supplies and traffic handling units to process emergency calls, when the power budget is under a second, predetermined level which is lower than the first level, not activating any of the traffic handling units and only keeping the control means and further monitoring hardware active, and when the power budget is under a third, predetermined level which is lower than the second level, shutting down the telecommunication apparatus preferably in a controlled manner. With the stay alive mechanism, three conditions are created, a first condition in which only emergency calls, and no regular calls are handled, a second condition at an even lower power budget in which no traffic is handled at all and only the control means and further monitoring, control and/or interfacing hardware is kept active to be able to remotely diagnose and/or remotely control the telecommunication apparatus, and a third condition for an even lower power budget, in which the telecommunication apparatus is controlled switched off.

Further features and advantages will be explained with reference to the appended drawings, in which a non-limiting embodiment of the telecommunication apparatus according to the invention is shown, in which.

Figure 1:
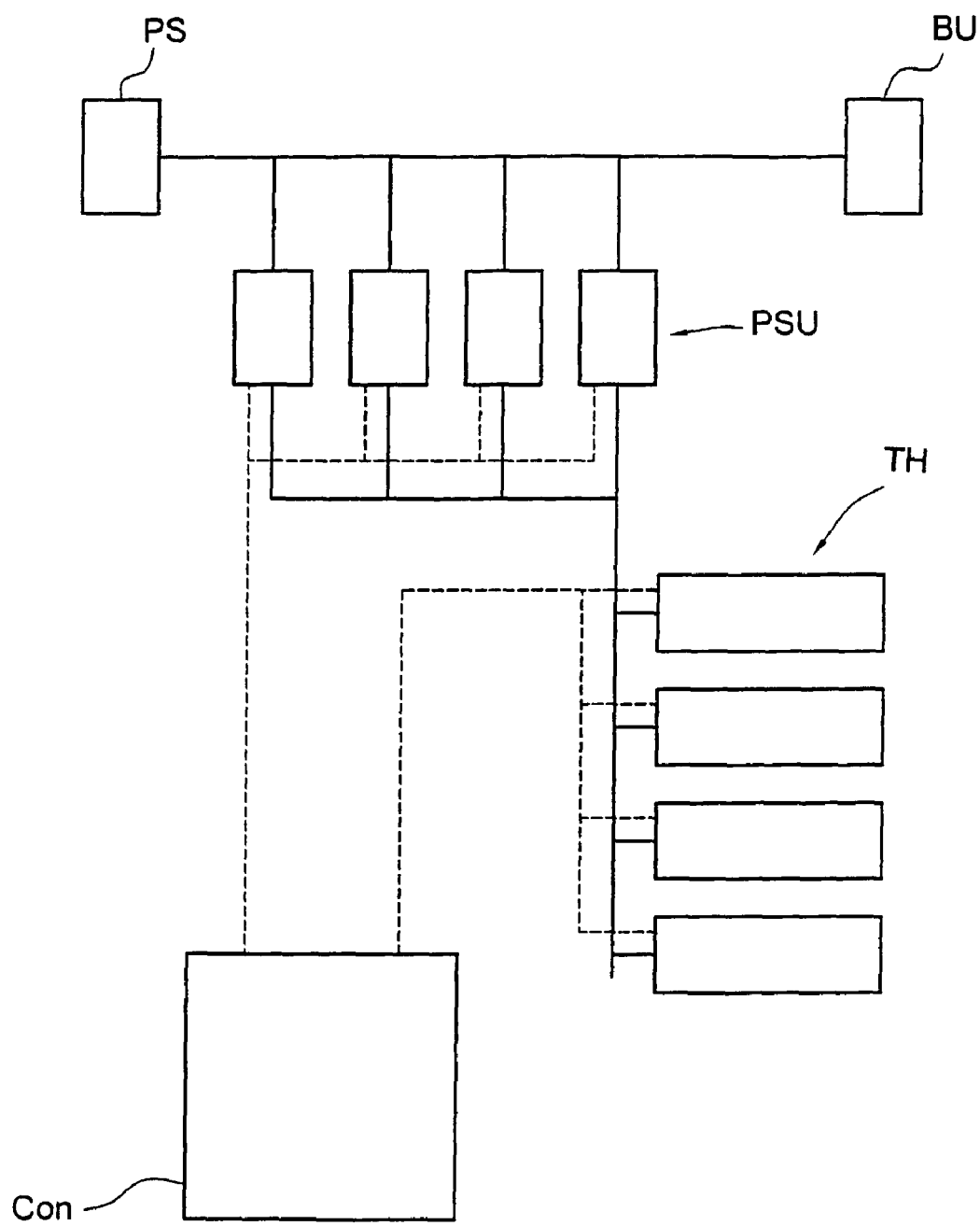
FIG. 1 depicts a telecommunication apparatus according to the invention.
Figure 2:
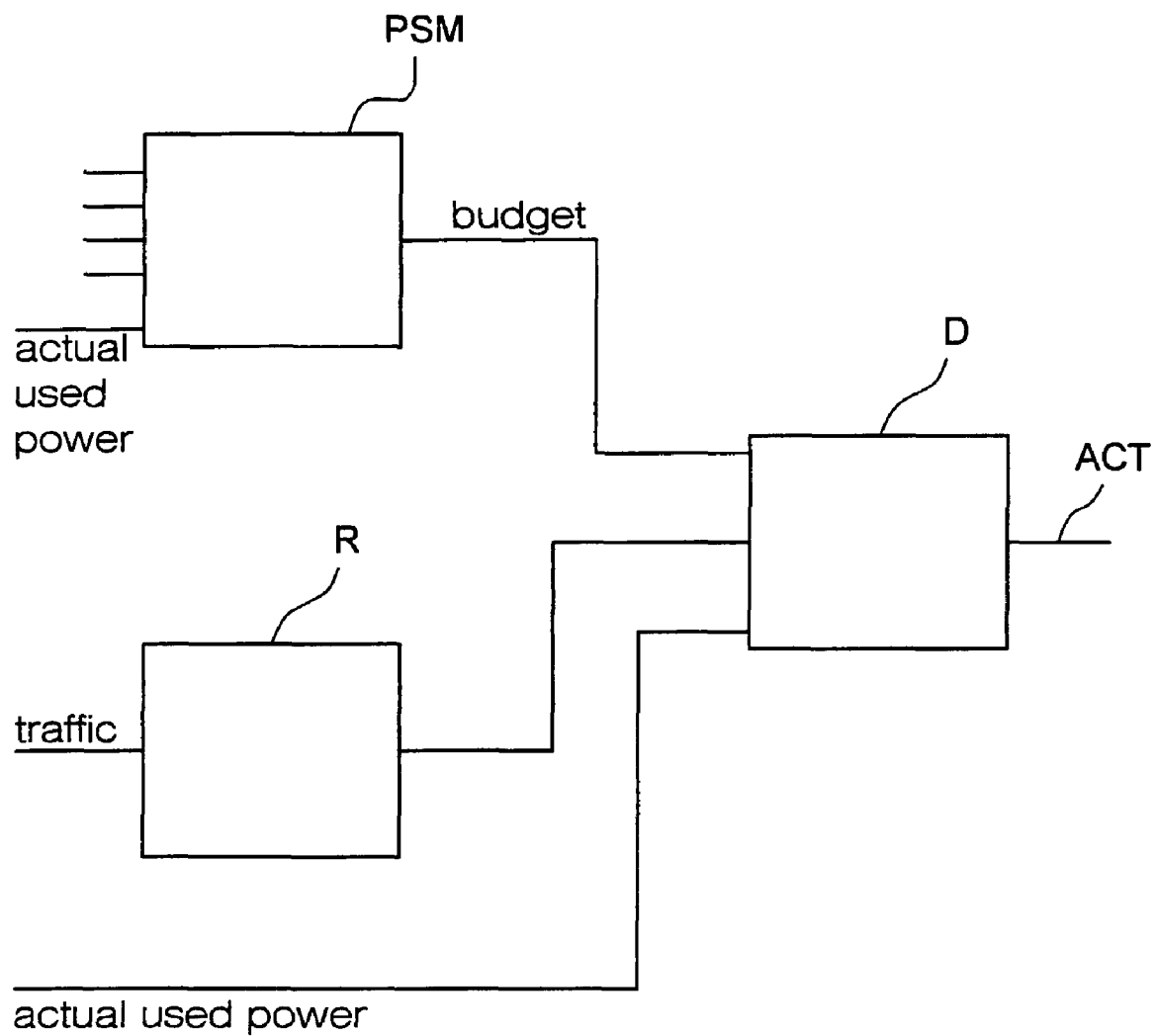
FIG. 2 depicts a detailed view of a part of control means of the telecommunication apparatus according to FIG. 1.

The telecommunication apparatus according to FIG. 1 comprises a plurality of traffic handling units TH. The telecommunication apparatus can e.g. be a base station of a mobile telecommunication network, the traffic handling units in such example comprising e.g. power amplifiers, processing units, etc. It is possible that all traffic handling units TH are identical, however also different types of traffic handling units may be comprised in the telecommunication apparatus. The telecommunication apparatus, and in particular the traffic handling units TH are supplied with electrical power by a plurality of power supply units PSU. The power supply units PSU may be identical, i.e. supply similar or identical voltages and apply a same amount of electrical power, however the power supply units can also have different capacities and/or supply different voltages. The power supply units PSU are operationally connected to the traffic handling units TH by a power bus schematically indicated by PB, for supplying electrical power from the power supply units PSU to the traffic handling units TH. The power supply units PSU are provided with electrical power by a power source PS such as an alternating current mains, a fuel powered generator, a solar cell system and/or a wind energy operated turbine. The power supply units PSU convert the electrical energy provided by the power source PS into supply voltages as required by the traffic handling units TH thus powering the traffic handling units. As a further source of energy, a backup, such as a battery backup BU is comprised in the system. The battery backup BU may be charged with electrical energy provided by the power supply PS, and can also act as a power source for providing electrical energy to the power supply units PSU for powering the telecommunication apparatus. For charging the battery of the battery backup BU, a charging circuit may be provided (not shown). A maximum power output of the power supply units preferably matches a maximum power consumption of the plurality of traffic handling units TH. Thus, the total output power of the power supply units is preferably substantially equal or slightly more than the total power consumption of all traffic handling units TH of the telecommunication apparatus. According to the invention, the telecommunication apparatus further comprises control means Con for activating an amount of traffic handling units and for activating an amount of power supply units. It goes without saying that the control means can also incorporate control means for further functions, such as handling of traffic, setting up communication connections, etc., which are not further described and/or depicted. The operation of the (appropriate part of) the control means will now be described with reference to FIG. 2.

The control means comprise a power status monitor PSM, a regulator R and a decider D. The power status monitor PSM comprises a number of inputs amongst which an input providing information on the actual used power by the telecommunication apparatus as a whole, and advantageously by the traffic handling units TH. Further, the power status monitor PSM comprises a plurality of input providing relevant information to the power status monitor for determining a power budget. The information (such as suitable signals) can comprise information concerning a status of the external power supply PS (such as an amount of power generated by solar cells, a value of a mains voltage, an amount of fuel in a fuel tank of a generator, etc. Further, one or more of the inputs can provide information regarding a charging condition of the battery backup BU of the apparatus and/or information concerning a status, such as a malfunctioning or a failure, of one or more of the power supply units PSU of the apparatus. With this information, the power status monitor PSM determines a power budget. The power budget is provided as an output signal of the power status monitor PSM to an appropriate input of the decider D. The power status monitor applies suitable algorithms for calculating the power budget, depending on the configuration and particulars of the power sources. As an example, the power budget might be linearly dependent on the amount of power provided by the external power source PS, might be dependent on a charging condition of the battery backup BU, taking into account a minimum required time of operation of the telecommunication apparatus. The power status monitor can further determine the power budget based on a criterion comprising a forecast for one or more parameters such as the amount of solar cell generated power, a charging condition of a battery, a value of a mains voltage, an amount of fuel in a fuel tank of a generator powering the apparatus, and a traffic load of the apparatus. Thus, not only a present situation is advantageously taken into account for determining the power budget, but also a forecast on a future value of one or more suitable parameters. The power status monitor can e.g. take account of a forecast, that during certain hours of the day a mains voltage will be low, the power status monitor thus setting the power budget such that a capacity of the battery backup BU is sufficient to be able to support the power provisioning of the mains such that provisioning of the mains (having a low value) in combination with a supplementary provisioning by the battery is able to power the telecommunication apparatus during the forecasted time during which the mains voltage has a low value. For the forecast, not only criteria directly related to powering may be used, but also a forecast of the traffic load of the apparatus may be taken into account. If e.g. during certain hours of the day, according to the forecast, the traffic load will be very high, while at the same time e.g. an external power supply provides little power (e.g. because solar cells do not provide sufficient power at sunrise) to power sufficient traffic handling units TH for providing sufficient capacity for handling the forecasted traffic load, the amount of energy stored in the battery backup may be taken into account for determining a power budget, such that the available power in the battery backup is balanced optimally to be able to cope with the forecasted traffic load of the telecommunication apparatus. The power status monitor can further generate a power error signal which signals an error condition in the power provisioning, e.g. because of failure of power supply units, failure of the battery backup, a usage of more power than allowed, etc. The regulator R generates a regulator signal which is output by the regulator and provided to an appropriate input of the decider D. The regulator signal provides a measure for the amount of capacity required to be able to cope with the current number of active calls. Therefore, the regulator can comprise proportional, integrative and/or differential transfer functions as described above. The decider D is further provided with a signal providing information about the amount of actually used power. The decider applies the budget as provided to it by the power status monitor PSM as a limit value determining a maximum to be used actual power by the telecommunication apparatus, it applies the regulator signal as provided to it by the regulator R as a desired value, i.e. a desired capacity for handling the current traffic, and it applies the input of the actual used power as a current value providing information on the current amount of power used. As long as the limit value, i.e. the maximum value as determined by the power budget is not exceeded, the decider will activate as many traffic handling units as required to handle the number of active calls. Thus, in this situation the telecommunication apparatus is allowed to switch on as much traffic handling units and as much power supply units as required to handle the current number of active calls. In case however that the budget as provided to the decider D is lower than the amount of power that would be needed for powering sufficient traffic handling units and sufficient power supply units for handling the amount of active traffic, the number of activated traffic handling units and the number of activated power supply units will be determined by the budget and consequently will be lower than as required to cope with the current traffic load. For activating power supply units and/or traffic handling units, the decider D is provided with appropriate output means, schematically indicated by activating output ACT. The decider can further be provided with a time delay to avoid instabilities in a control loop switching on and switching of power supply units and/or to enable the control means to transfer traffic from a traffic handling unit which is to be switched off to another traffic handling unit, or to otherwise terminate or redirect traffic before switching off, i.e. de-activating a respective traffic handling unit.

For optimum power efficiency, it is preferred that a maximum output power of a power supply unit PSU according to FIG. 1 corresponds to a maximum power consumption of a traffic handling unit TH. Thus, when a traffic handling unit TH is activated or de-activated, a corresponding one of the power supply units PSU may be activated respectively de-activated also. Also it is possible that a maximum power output of a subgroup of the plurality of power supply units matches a maximum power consumption of a subgroup of the plurality of traffic handling units so that a direct relation between the amount of traffic handling units that are activated and the amount of power supply units that are activated may be provided.

Figure 3:
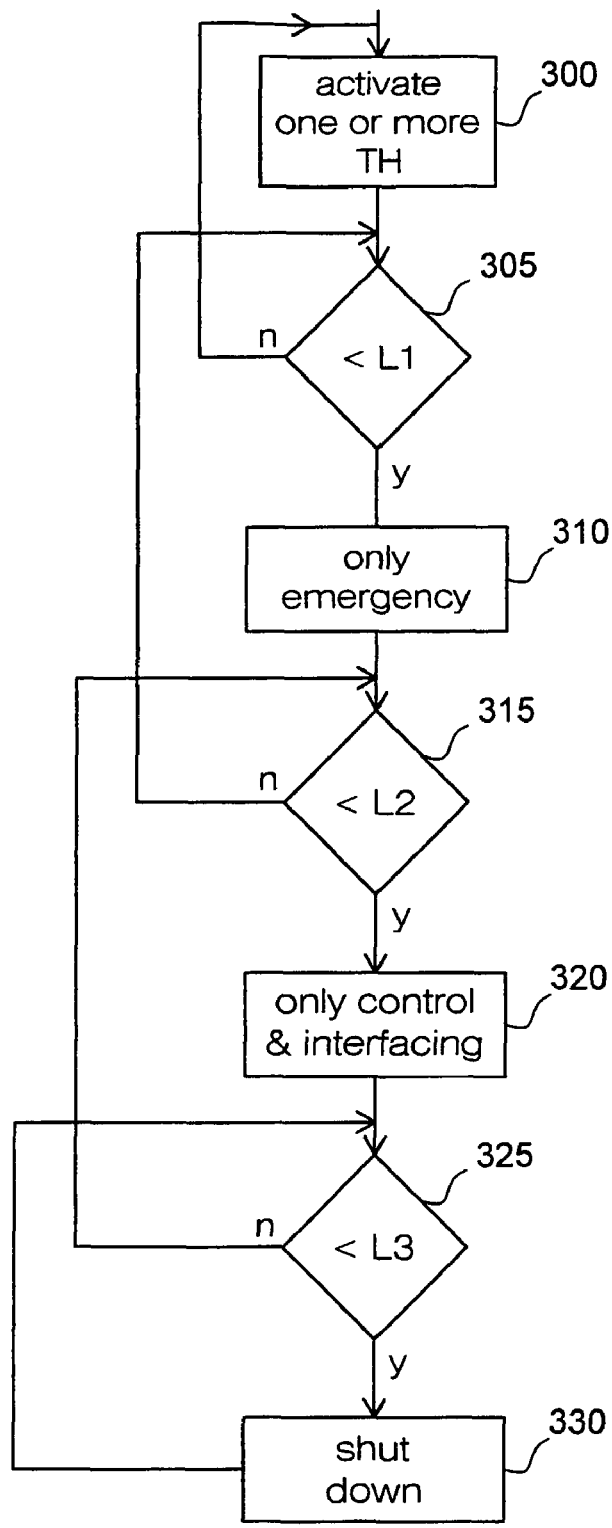
FIG. 3 schematically depicts a flow diagram of a stay alive mechanism of the telecommunication apparatus according to the invention.

In a further advantageous embodiment, the control means comprise a stay alive mechanism, e.g. programmed in suitable software, for only activating a power supply and traffic handling unit to process emergency calls when the power budget as calculated by the power status monitor PSM is below a first level, for not activating any traffic handling units at all and only keeping the control means and further monitoring hardware active, when the power budget is below a second level which is lower than the first level, and for shutting down the telecommunication apparatus when the power budget is below a third level which is lower than the second level. The stay alive mechanism is advantageously programmed in the decider D according to FIG. 2. An embodiment of the stay alive mechanism is depicted in FIG. 3 in which 300 represents a state in which one or more of the traffic handling units are activated, 310 represents a state in which only traffic handling units are activated for emergency calls, 320 represents a state in which no traffic handling units are activated at all, but only control functions and remote control functions are activated, and 330 represents a state in which the telecommunication apparatus is shut down. Decisions to go from one state to another state are represented by the decision steps 305 in which is checked if the power budget is below a first level L1, step 315 in which is checked if the power budget is below the first level L1, step 315 in which is checked if the power budget is below the second level L2, and step 325 in which is checked if the power budget is below the third level L3. In the steps 305, 315 and 325, it is checked if a transfer is to be made between the current state, e.g. 300, and the following state of the stay alive mechanism (e.g. 310). If in step 305 it is determined that the power budget is not lower than the first level L1, than it is returned to step 300, while in the case that the budget appears to be lower than the first level, the mechanism proceeds with step 310. Likewise, similar decisions are performed by 315 and 325. The stay alive mechanism depicted in FIG. 3 can also be applied in reverse order (controller power-up), i.e. when the telecommunication apparatus is shut down, and starts to operate again, in step 325 it is checked if the power budget is below the third level, and if not, in step 315 is checked if the power budget is below the second level, etc.

For implementing the forecast, the telecommunication apparatus may comprise a data acquisition unit for acquiring relevant data, memory means for storing the data and data processing means (including suitable software) for determining a forecast from the stored data.

What is claimed is:

1. A telecommunication apparatus having a plurality of traffic handling units, and a plurality of power supply units for powering the plurality of traffic handling units, comprising:
    a control means adapted to receive input information on a power criterion so as to determine a power budget for the plurality of power supply units and plurality of traffic handling units based on the power criterion wherein the power budget is determined by:
       determining the power requirement for maximum traffic handling of all the traffic handling units,
       determining the maximum available power from all the power supply units.
       calculate a power criterion that includes the power requirement for maximum traffic handling of all the traffic handling units and the maximum available power from all the power supply units, and
       set the power budget based on the power criterion; and
    the control means operable to activate an amount of traffic handling units of the plurality of traffic handling units having a total power consumption equal to or less than the power budget; and
    the control means operable to activate an amount of power supply units of the plurality of power supply units matching the total power consumption of the amount of activated traffic handling units, wherein the control means are operable to transfer active traffic from a traffic handling unit which is to be de-activated, to one or more of the other activated traffic handling units, before de-activating the to be de-activated traffic handling unit.

2. The telecommunication apparatus of claim 1, wherein the control means are adapted to transfer active traffic from a traffic handling unit which is to be de-activated, to one or more of the activated traffic handling units, before de-activating the to be de-activated traffic handling unit.

3. The telecommunication apparatus of claim 1, wherein a maximum power output of a subgroup of the plurality of power supply units matches a maximum power consumption of a subgroup of the plurality of traffic handling units.

4. The telecommunication apparatus of claim 1, wherein the control means further comprises:
    a power status monitor for determining the power budget based on the power criterion;
    a regulator for generating a regulator signal from an amount of active traffic; and
    a decider for deciding on an activation of one or more of the plurality of power supply units based on the power budget as determined by the power status monitor, the regulator signal and an actual power consumption.

5. The telecommunication apparatus of claim 4, wherein the decider comprises a decision mechanism for taking account of the power budget as a limit value, the regulator signal as a desired value, and the actual used power as a factual value, the decision mechanism being adapted for activating as many power supply units and traffic handling units as required to match the regulator signal, the decision mechanism however being adapted to activate no more power supply units and traffic handling units than allowed by the power budget.

6. The telecommunication apparatus of claim 1, wherein the control means further comprises:
   a stay alive mechanism operable, when the power budget is under a first, predetermined level, to only activate power supplies and traffic handling units to process emergency calls;
   the stay alive mechanism operable, when the power budget is under a second, predetermined level which is lower than the first level, to not activate any of the traffic handling units and only keep the control means and further monitoring hardware active, and
   the stay alive mechanism operable, when the power budget is under a third, predetermined level which is lower than the second level, to shut down the telecommunication apparatus.

7. The telecommunication apparatus of claim 1, wherein the power criterion comprises at least one selected from the group consisting of: an amount of solar cell generated power, a charging condition of a battery for supplying power to the apparatus, a value of a mains voltage supplied to the apparatus, an amount of fuel in a fuel tank of a generator for generating power for feeding the apparatus, and a failure of a power supply unit.

8. The telecommunication apparatus of claim 7, wherein the control means are adapted to transfer active traffic from a traffic handling unit which is to be de-activated, to one or more of the activated traffic handling units, before de-activating the to be de-activated traffic handling unit.

9. The telecommunication apparatus of claim 7, wherein a maximum power output of a subgroup of the plurality of power supply units matches a maximum power consumption of a subgroup of the plurality of traffic handling units.

10. The telecommunication apparatus of claim 7, wherein the control means further comprises:
    a power status monitor for determining the power budget based on the power criterion;
    a regulator for generating a regulator signal from an amount of active traffic; and
    a decider for deciding on an activation of one or more of the plurality of power supply units based on the power budget as determined by the power status monitor, the regulator signal and an actual power consumption.

11. The telecommunication apparatus of claim 10, wherein the decider comprises a decision mechanism for taking account of the power budget as a limit value, the regulator signal as a desired value, and the actual used power as a factual value, the decision mechanism being adapted for activating as many power supply units and traffic handling units as required to match the regulator signal, the decision mechanism however being adapted to activate no more power supply units and traffic handling units than allowed by the power budget.

12. The telecommunication apparatus of claim 7, wherein the control means further comprises:
    a stay alive mechanism operable, when the power budget is under a first, predetermined level, to only activate power supplies and traffic handling units to process emergency calls;
    the stay alive mechanism operable, when the power budget is under a second, predetermined level which is lower than the first level, to not activate any of the traffic handling units and only keep the control means and further monitoring hardware active, and
    the stay alive mechanism operable, when the power budget is under a third, predetermined level which is lower than the second level, to shut down the telecommunication apparatus.

13. The telecommunication apparatus according to claim 1, wherein the power criterion comprises a forecast of at least one selected from the group consisting of: an amount of solar cell generated power, a charging condition of a battery for supplying power to the apparatus, a value of a mains voltage supplied to the apparatus, an amount of fuel in a fuel tank of a generator for generating power for feeding the apparatus, and a traffic load of the apparatus.

14. The telecommunication apparatus of claim 13, wherein the control means are adapted to transfer active traffic from a traffic handling unit which is to be de-activated, to one or more of the activated traffic handling units, before de-activating the to be de-activated traffic handling unit.

15. The telecommunication apparatus of claim 13, wherein a maximum power output of a subgroup of the plurality of power supply units matches a maximum power consumption of a subgroup of the plurality of traffic handling units.

16. The telecommunication apparatus of claim 13, wherein the control means further comprises:
    a power status monitor for determining the power budget based on the power criterion;
    a regulator for generating a regulator signal from an amount of active traffic; and
    a decider for deciding on an activation of one or more of the plurality of power supply units based on the power budget as determined by the power status monitor, the regulator signal and an actual power consumption.

17. The telecommunication apparatus of claim 16, wherein the decider comprises a decision mechanism for taking account of the power budget as a limit value, the regulator signal as a desired value, and the actual used power as a factual value, the decision mechanism being adapted for activating as many power supply units and traffic handling units as required to match the regulator signal, the decision mechanism however being adapted to activate no more power supply units and traffic handling units than allowed by the power budget.

18. The telecommunication apparatus of claim 13, wherein the control means further comprises:
    a stay alive mechanism operable, when the power budget is under a first, predetermined level, to only activate power supplies and traffic handling units to process emergency calls;
    the stay alive mechanism operable, when the power budget is under a second, predetermined level which is lower than the first level, to not activate any of the traffic handling units and only keep the control means and further monitoring hardware active, and
    the stay alive mechanism operable, when the power budget is under a third, predetermined level which is lower than the second level, to shut down the telecommunication apparatus.

* * * * *